United States Patent
Hoeck, Jr.

(10) Patent No.: US 6,585,452 B1
(45) Date of Patent: Jul. 1, 2003

(54) ORGANIC COMPOSITION FOR EROSION CONTROL AND BARRIER FORMATION

(75) Inventor: John L. Hoeck, Jr., Eugene, OR (US)

(73) Assignee: Rexius Forest By-Products, Inc., Eugene, OR (US)

( * ) Notice: Subject to any disclaimer, the term of this patent is extended or adjusted under 35 U.S.C. 154(b) by 0 days.

(21) Appl. No.: 10/180,607

(22) Filed: Jun. 27, 2002

(51) Int. Cl.⁷ .............................. C09K 17/00; E02D 3/12
(52) U.S. Cl. ...................... 405/4; 405/302.6; 405/302.4
(58) Field of Search ................. 71/5, 6, 9, 23; 405/302.6, 302.4, 264

(56) References Cited

U.S. PATENT DOCUMENTS

| | | | | |
|---|---|---|---|---|
| 3,919,015 A | * | 11/1975 | Bolza | 149/42 |
| 3,939,662 A | * | 2/1976 | Volz | 405/264 |
| 3,943,078 A | * | 3/1976 | James | 524/563 |
| 5,110,484 A | * | 5/1992 | Sheu et al. | 507/110 |
| 5,207,826 A | * | 5/1993 | Westland et al. | 106/162.5 |
| 5,207,830 A | * | 5/1993 | Cowan et al. | 106/672 |
| 5,306,327 A | * | 4/1994 | Dingeman et al. | 75/313 |
| 5,459,162 A | * | 10/1995 | Saxton | 514/499 |
| 5,626,658 A | * | 5/1997 | McArdle | 106/144.1 |
| 5,824,707 A | * | 10/1998 | Saxton | 514/499 |
| 6,168,803 B1 | * | 1/2001 | Harris et al. | 424/442 |
| 6,349,499 B1 | * | 2/2002 | Spittle | 47/9 |

FOREIGN PATENT DOCUMENTS

| | | | | |
|---|---|---|---|---|
| DE | 4228023 A1 | * | 8/1992 | A01G/1/04 |
| WO | WO9008020 | * | 7/1990 | B27N/1/02 |

* cited by examiner

*Primary Examiner*—J. J. Swann
*Assistant Examiner*—Katherine Mitchell
(74) *Attorney, Agent, or Firm*—James D. Givnan, Jr.

(57) ABSTRACT

A biodegradable product for use as a ground cover or in the formation of a berm and comprising a major component of organic particulate as compost or a mulch containing compost. Additional components include granular molasses, granular guar, cotton seed meal and soy bean meal. A blower system for delivery of the product is disclosed in U.S. Pat. No. 6,036,406 incorporated herein by reference, and which discloses a vehicle supported system for mixing and discharging the product. The present product applied as a blanket serves to inhibit erosion and promote plant growth. When used in berm construction, the product constitutes a barrier aiding in the confinement of hazardous matter.

8 Claims, No Drawings

ORGANIC COMPOSITION FOR EROSION CONTROL AND BARRIER FORMATION

BACKGROUND OF THE INVENTION

The present invention pertains generally to a product for ground placement as a cover or as a berm to protect water runoff quality and promote vegetation growth when desired.

At construction sites for commercial buildings, homes, roadways, mines, etc., substantial damage is imparted to ground surfaces. Destruction of natural ground cover is commonplace by reason of construction equipment disturbing the ground surface. For a period of time, during and after construction efforts, considerable erosion may occur. Construction or work sites may additionally be subject to contamination which when not confined may migrate to adversely affect ground surfaces and waterways adjacent the construction site.

The foregoing problems have been recognized by the federal government resulting in legislation that in the near future all construction projects, one acre in size or larger, will be required to file an erosion control plan. Further, particulate flow from such sites toward waterways will be severely restricted under such legislation.

Additional concern has been directed toward controlling erosion and contamination at locations along freeways where contamination by hydrocarbons from vehicle oil, fuel and exhaust occurs which may eventually enter waterways.

SUMMARY OF THE PRESENT INVENTION

The present product is directed toward a blend of organic matter for erosion, sediment and contaminant controlling purposes.

A primary component of the present product is compost, which may be in a mulch, which functions as a substrate for the growth of microbial populations to build a soil structure resistant to erosion while enhancing vegetative growth if desired. The additional components of the present product enhance the growth of cohesive and filamentous microorganisms in addition to aiding immediate structural enhancement. The compost is accordingly fortified to prevent erosion and assist in breaking down some of the oils, petroleum hydrocarbons and other environmentally hazardous materials found in typical roadside runoff.

The present product serves, when in the form of a berm, increases filtration properties beyond that of a berm formed entirely of compost mulch and to enhance the hydrocarbon degrading agents of the berm and water infiltration of the berm. Seed germination is accelerated by the present product when applied in berm form or as a ground cover. The present berm also serves to intercept and disperse a flow of water thereby reducing velocity of same to prevent soil displacement.

The present product, being biodegradable, may be left in place at a work site at completion of construction efforts.

DETAILED DESCRIPTION OF THE PREFERRED EMBODIMENTS

The following description of the present product is with regard to specific quantity of compost, with or without mulch, which may vary somewhat as compost generally is subject to many variables. For present purposes the compost is preferably of the type sold in bulk and delivered to the work or other site by a truck equipped with a blower system and a flexible conduit for controlled discharge of the product. Other delivery means may be suitable.

In a quantity, for example, of one cubic yard of compost the following components are mixed:

guar, preferably in powdered form, mixed with the compost at the rate of one-half pound to three pounds per cubic yard of compost;

molasses, preferably in granular form, added at the rate of one-eighth pound to one pound per cubic yard of compost;

cotton seed meal, added at the rate of one-half pound to four pounds per cubic yard of compost; and soy bean meal added at the rate of one-eighth pound to one pound per cubic yard of compost.

The present product may be satisfactorily mixed at a delivery site by feeding of the components into an airflow from a truck mounted blower delivery system with the lesser components deposited by an air lock type feeder mechanism into the airflow. The airflow with the lesser components is then fed to a chamber also served by a rotary feeder depositing compost particulate into the airflow. Such rotary feeders include an airlock feature to prevent escape of the airflow from the mixing chambers.

While cotton seed meal is preferred, as noted above, a suitable substitution is corn meal.

U.S. Pat. No. 6,036,406, incorporated herein by reference, discloses a vehicle equipped with a blower system suitable for mixing and discharging the present composition. A discharge hose extends from the vehicle to permit dispersal of the present product to a specific area of the site or over various surface areas to serve as a ground cover in blanket or berm form.

For formation of a berm with the present product to filter water and restrict the flow of hazardous matter from a site, a berm forming apparatus of the type disclosed in a co-pending U.S. patent application Ser. No. 10/047,393, may be utilized. The apparatus is in receiving communication with the discharge hose of the aforementioned vehicle mounted blower system. A berm approximately one foot high and two feet wide at its base has been found adequate for many work sites.

The present product, when utilized for erosion control, may be applied as a ground cover blanket at a depth of one to six inches.

In some embodiments, the soy bean meal may be omitted.

While I have shown but a few embodiments of the present composition, it will be apparent to those skilled in the art that the invention may be embodied still otherwise without departing from the spirit and scope of the claimed invention.

I claim:

1. An erosion preventing compound for deposit on an earthen surface and comprising, organic particulate, granular molasses at a rate of one-eighth pound to one pound per cubic yard of organic particulate, powdered guar at a rate of one-half pound to three pounds per cubic yard of organic particulate, and seed meal at a rate of one-half pound to four pounds per cubic yard of organic particulate; whereby the erosion preventing compound is capable of being discharged and shaped into a berm without further components being added to the compound.

2. The article claimed in claim 1 wherein said organic particulate includes a major weight component of compost.

3. The article claimed in claim 2 additionally including soybean meal at a rate of one-eighth pound to one pound per cubic yard of organic particulate.

4. The article claimed in claim 1 additionally including soybean meal at a rate of one-eighth pound to one pound per cubic yard of organic particulate.

5. The article claimed in claim 1 wherein said seed meal is cotton seed meal.

6. The article claimed in claim 5 additionally including soybean meal at a rate of one-eighth pound to one pound per cubic yard of organic particulate.

7. The article claimed in claim 1 wherein said seed meal is corn meal.

8. The article claimed in claim 7 additionally including soybean meal at a rate of one-eighth pound to one pound per cubic yard of organic particulate.

* * * * *